No. 768,188. PATENTED AUG. 23, 1904.
J. J. McINTYRE & H. BAGSHAW.
HOSE BINDER.
APPLICATION FILED DEC. 18, 1903.
NO MODEL.
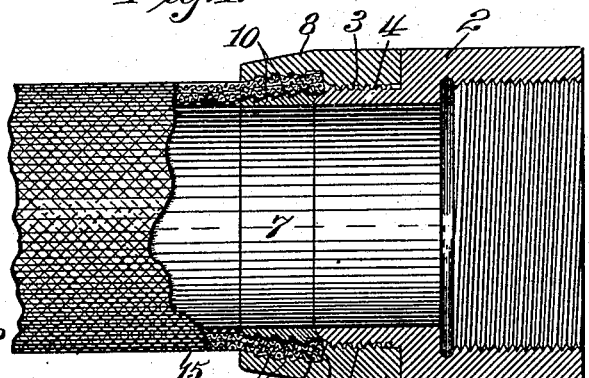
Fig. 1.
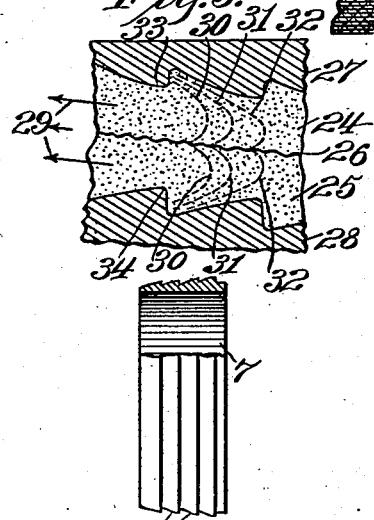
Fig. 5.
Fig. 4.
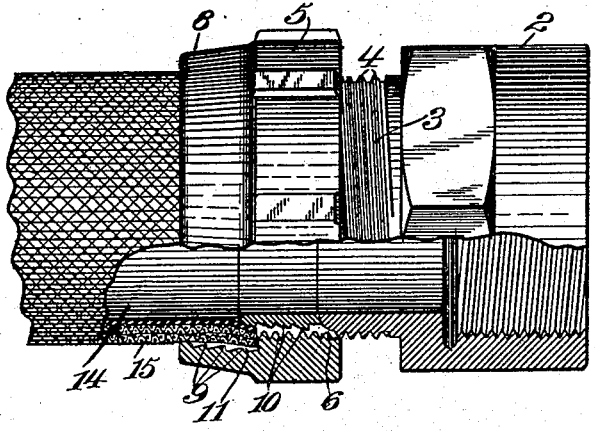
Fig. 2.
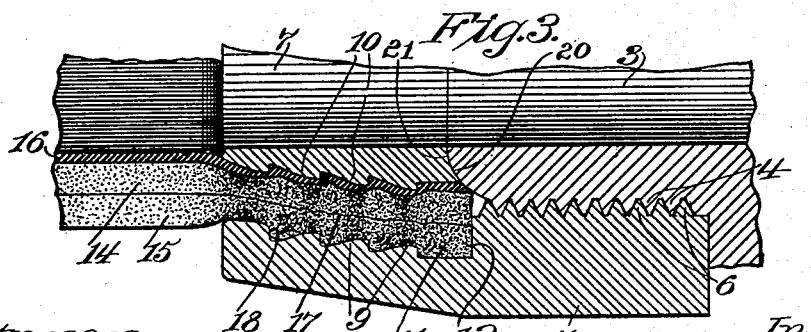
Fig. 3.
Witnesses:
F. E. Maynard
R. W. Pittman
Inventors:
John J. McIntyre;
Herbert Bagshaw,
By their Attorney
F. H. Richards No. 768,188. Patented August 23, 1904.

UNITED STATES PATENT OFFICE.

JOHN J. McINTYRE AND HERBERT BAGSHAW, OF HARTFORD, CONNECTICUT.

HOSE-BINDER.

SPECIFICATION forming part of Letters Patent No. 768,188, dated August 23, 1904.

Application filed December 18, 1903. Serial No. 185,626. (No model.)

*To all whom it may concern:*

Be it known that we, JOHN J. MCINTYRE and HERBERT BAGSHAW, citizens of the United States, residing at Hartford, in the county of Hartford and State of Connecticut, have invented certain new and useful Improvements in Hose-Binders, of which the following is a specification.

This invention relates to and has for an object to provide an improved and efficient hose-binder.

In the drawings accompanying and forming part of this specification a form of our invention is illustrated, wherein—

Figure 1 shows a central longitudinal section of a hose-coupling embodying the present improvement and wherein a portion of a hose is shown in central longitudinal section and a portion of a hose in side view, showing the parts with the hose bound in the coupling. Fig. 2 is a side view, partly broken away on a central longitudinal line, showing the hose at the incipient stage of the binding. Fig. 3 is an enlarged detail on the central section, showing the parts with the hose bound in the coupling. Fig. 4 is a side view, partly broken away, of a form of binding-wedge; and Fig. 5 is a diagram illustrating a theory of the action of the device upon the hose.

Similar characters of reference denote like parts in all the drawings.

In the drawings the binder is shown constructed in connection with one part of an ordinary hose-coupling—such a coupling, for instance, as is used on fire-hose.

The present improvements are specially intended for use on hose for fire-engine service, and particularly hose of that kind intended for use under pressures. In hose frequently employed for that service the hose-tube is made of two tubes, one within the other, the inner one of the two being lined with rubber of a firm and tough quality, and the layer of rubber being of sufficient thickness to withstand the frictional wear of the stream of water for a considerable period without breaking through so as to permit the hose to leak. It may be stated in this connection that it is well known that the double hose made, as stated, of two tubes one within the other has an advantage as regards the bending of the hose when under high pressure, since one tube might slide slightly within the other, and thus assist in accommodating the stress due to the internal pressure and the longitudinal strains upon the hose due to the bending thereof. This double construction of the hose, however, has a disadvantage, as we have found by experience, in the screw attachment of the end of such a double hose to the coupling.

Both of the hose-tubes are usually of heavy fabric woven closely of yarn of high quality, such as commonly used by city fire departments for high-pressure service. On account of the pressure, and especially by reason of the division of the hose-wall into two portions, there is a tendency for the inner portion of the hose-pipe to slide out from within the outer portion, and this action, although very small and slow, gradually operates in the devices of this class heretofore employed to reduce the stability of the fastening, and thus lead to occasional accidents through the separation of the hose while the fire-engine is in use. Even a comparatively rare occurrence of this kind is liable to indirectly result in great disaster, and it is therefore one of the principal objects of our present improvements to provide efficient means for overcoming such a result, and, as above mentioned, we have by the practical use of our improvement in actual service demonstrated the exceptional high power and security of the attachment which is made by means of our improvement between the hose and the hose-coupling.

While our improvement is well adapted for holding single thickness of hose, especially of heavy construction, it is particularly advantageous for use in holding double hose, such as we have mentioned, and the disasters alluded to are thereby forestalled.

The hose-coupling, a portion of which is designated by 2, is provided with an annular projection or sleeve 3, which has the screw-thread 4, and upon this threaded sleeve is fitted the outer ring 5 of the binder, said sleeve 3 being considered as the inner ring of Forward of the inner ring 3 there is a combined expander and retainer, which we sometimes hear referred to as the "wedge," (designated by 7.) This member 7 (best shown in Figs. 2 and 3) is of wedge-like construction—that is, in a general way of the character of an annular wedge. The projecting flange portion 8 of the ring 5 constitutes the retaining-ring of the device, and it is provided on its inner surface with a series of abutments, of which a suitable form and construction is illustrated in the drawings, these abutments being designated by 9 and an opposing series of abutments of substantially corresponding form on the wedge 7 being designated by 10. The hose chamber or socket is shown in the form of an annular space in the members 5 and 7 (designated in a general way by 11) and is adapted for receiving the slightly-expanded end of a hose when the wedge 7 is forced into it by means of the screw-threads 4 and 6. The hose may thereby be so firmly grasped between the opposing abutments 9 and 10 as to hold the hose with a very high degree of power and security. There is shown a shoulder or abutment 12 at the inner end of the hose-chamber 11, against which the end of the hose may abut and whereby the insertion of the hose to the required distance and no farther will be insured. In the present improvement the hose is inserted the full distance into the socket before the wedge is applied, and the nature of the mechanism of the hose-binder is such that it would be impractical to have any sliding of the hose in said ring during the process of applying the wedge thereto.

For the purpose of illustrating the manner as we apprehend the results due to the special organization and construction of the binder are obtained we will refer now to the enlarged partial sectional view shown in Fig. 3. In this view the inner portion of the hose is designated by 14 and the outer portion by 15. The layer of rubber on the inner part of the inner tube is designated by 16. The sectional view of the inner and outer tubes 14 and 15 of the hose is indicated by the shading, the irregular line 17 indicating the contacting surfaces between the two hose-tubes, and the irregularity of that portion of line 17 which extends within the space is intended to illustrate the manner in which the hose-tubes are there forced together by the grasping of the ends of the hose between the inner and outer members 7 and 8, respectively, of the hose-binder. There are also diagrammatic lines—as indicated, for instance, at 18—which are intended to illustrate the manner in which we understand the abutments to act with re-ard to the locking of the hose against slipping outwardly from the space.

It will be observed that we have shown the inner series of abutments on the wedge of less height than the outer series, and in practice we prefer to make the inner abutments about one-half, or a little less, the height of the outer series, especially when using double hose of the particular kind hereinbefore more fully described. The hose having been placed within the member 8 when the wedge 7 is removed, said wedge 7 is then inserted in any convenient way with the point thereof within the slightly-expanded outer end of the hose. At this time the hose is already in the outer ring the full depth of the space 11. Next the member 3 is screwed into the member 5 a short distance until the portion 20 of the member 3 engages the seat 21 of the wedge 7, the wedge at this time being located partially within the threaded portion 6 of said member 5, as more fully indicated in Fig. 2. The joint between the wedge and the member which tends to force it into position is so formed that the wedge may move relatively to such member and adjust itself. This may be regarded as a self-centering joint. The seat 21 and mating portion 20 are illustrated as constituting a ball-joint organized to permit the wedge to adjust or center itself and assume its proper position. It will of course be apparent that the surfaces of this joint need not necessarily be spherical. The relative sizes of the large end of the wedge and the inner side of the thread in the outer rim are such that the wedge is guided when it is inserted with its point within the end of the hose and before the part 3 is screwed into the said outer rim. To provide for this, the threaded portions 4 and 6 are longer than the required movement of the wedge 7, so that the said screw-threads may be employed for forcing the wedge 7 into full engagement with the hose and for driving said wedge into its final position for completely performing its function of coacting with the ring portion 8 to form the annular space 11 with its hose-engaging abutments.

Referring again to Fig. 3 and to the diagrammatic lines 18, it will be seen how there naturally results a certain tendency to "arch" as regards the matter of the hose, which is under compression between the inner and outer rings of the hose-binder portion of the coupling. When the outward force upon the hose tends to draw the end of the hose out of its seat between said rings, resistant arches will be developed in the material. The material thus subjected to pressure naturally tends to move forwardly and outwardly, so that the resultant stresses which are set up within the compressed end of the hose operate to press the hose against the several abutments in such manner as to maintain rather than destroy the effectiveness of the interlocking grasp which exists between the hose-tubes and the annular members which grasp the hose. Furthermore, the end of the hose being expanded to a larger diameter, in connection with the other features just described, operates to make the size of the annular lines of force progressively increase toward the extreme end of the hose within the space 11, and thus the stresses normally tend when the hose is powerfully strained to add to rather than to depreciate from the holding power of those abutments which are most near to the outer end of the said space 11.

Fig. 5 is a greatly-enlarged view of a portion of the opposing engaging devices, with diagrammatic lines drawn for the purpose of indicating what we apprehend to be the mode of action by which said devices as organized in our present improvement operate to seize and retain the hose in place. It will be observed that the two portions of the hose 24 25, as indicated by the middle line 26, are compressed one upon the other into a firm interlocking engagement, so that in a sense the two portions of the hose where compressed between the opposing inner and outer rings 27 28 become for the time being substantially a single member. The arrows 29 indicate the direction of the stress or pull on the compressed portion of the hose, and the diagrammatic lines 30 31 32 are intended to indicate in an approximate manner the way in which the natural tendency of the hose to be drawn out of the binder is counteracted by the opposing tendency of the material in the hose to become distributed or arranged after the manner of "arching," whereby the static arches thus formed with relation to the inner and outer abutments 33 and 34 serve to powerfully and successfully oppose the other tendency of the pull upon the hose to draw this out of the binder. In a sense this tendency of the forces so applied to the material under tension to arrange or form such static arches within such material may be said to correspond to the similar tendency which occurs in the sand in an hour-glass and in grain where it leaves a bin or reservoir to enter a spout or conduit, these being phenomena well known to those who are familiar with such lines of work.

Having thus described our invention, we claim—

1. The combination with an annular member having an undercut chamber provided with annular teeth, and having a portion provided with screw-threads, a coupling member having mating screw-threads, a wedge having annular teeth upon its outer side and adapted to be pressed by said coupling member upon a hose within said undercut chamber, the wedge and coupling member having a ball-joint connection.

2. In a hose-coupling the combination with a member having an undercut chamber and a shoulder at the inner end thereof, screw-threads adjacent to such abutment, hose-holding abutments within the chamber, a wedge of annular formation and having hose-holding abutments upon its perimeter and adapted when forced into the chamber from the region of the screw-threads to securely bind the end of the hose which may occupy such chamber and abut the shoulder therein, and means having a ball-joint connection with the wedge and a screw-threaded connection with the said member to force said wedge into the chamber.

3. In means for binding to a coupler a hose having a tube and an unsecured inner tube lined with a puncturable material, means to engage the outer side of the outer tube and the inner side of the lining of the inner tube, annular hose-engaging teeth upon the means to engage the former, annular hose-engaging teeth of less projection upon the means to engage the latter, and means to bind such engaging means upon the hose and press the plies thereof into substantially an integral body.

4. In a hose-coupling the combination with a coupling-head having an exterior screw-threaded sleeve, a coupling-ring having interior screw-threads to mate therewith, an undercut chamber portion at the other end of said ring, a shoulder at the bottom of such chamber, and hose-engaging teeth upon the side wall of such chamber, a wedge to enter such chamber and engage a hose therein having hose-engaging teeth upon its outer wall of less projection than those on the wall of the said chamber, and having a face to be engaged by a face upon said sleeve to press the same into the chamber and upon the hose, the large end of such annular wedge having a loose working fit with the interior screw-threaded portion of the ring whereby the wedge may pass through the same and be guided thereby in its initial engagement with the hose.

5. In a hose-binder the combination with a member to spread the end of a hose, of a member to support the outside of the hose at the spread portion, and abutments on the said members to compress the hose and hold the same against displacement, the abutments on the member to spread the end having less projection than the abutments on the member to support the outside.

6. In a hose-binder, the combination with a member to support the outside of a hose, abutments thereon, a wedge to expand the hose within said supporting member, and a member having screw-threaded engagement with such outside member, and a ball-joint connection with the wedge to force the same into position in the end of the hose and to bind the same therein.

7. In a hose-binder, the combination with a member to support the outside of the end of a hose and having an interiorly-screw-threaded sleeve, a wedge having a loose working fit with such screw-threaded sleeve and adapted to seat upon the hose within said member, means having screw-threaded connection with said sleeve to force the wedge into position and a self-centering joint between said means and the wedge.

8. In a hose-binder, the combination with an expander to engage the end of a hose and change its area in cross-section, of a member to support the hose upon the opposite side and between which members the hose may be compressed, abutments upon the supporting member and abutments of less projection upon the expander whereby to increase the compression at some points between such members.

JOHN J. McINTYRE.
HERBERT BAGSHAW.

Witnesses:
EDWARD T. MURPHY,
HENRY BISSELL.